US012090756B2

(12) United States Patent
Murayama

(10) Patent No.: US 12,090,756 B2

(45) Date of Patent: Sep. 17, 2024

(54) RECORDING APPARATUS

(71) Applicant: SEIKO EPSON CORPORATION, Tokyo (JP)

(72) Inventor: Osamu Murayama, Higashichikuma-Gun Yamagata (JP)

(73) Assignee: Seiko Epson Corporation, Tokyo (JP)

( * ) Notice: Subject to any disclaimer, the term of this patent is extended or adjusted under 35 U.S.C. 154(b) by 163 days.

(21) Appl. No.: 17/809,478

(22) Filed: Jun. 28, 2022

(65) Prior Publication Data

US 2022/0410567 A1 Dec. 29, 2022

(30) Foreign Application Priority Data

Jun. 29, 2021 (JP) ................................ 2021-107559

(51) Int. Cl.

*B41J 2/045* (2006.01)
*B41J 13/00* (2006.01)

(52) U.S. Cl.

CPC ....... *B41J 2/04556* (2013.01); *B41J 13/0009* (2013.01)

(58) Field of Classification Search

CPC . B41J 2/04556; B41J 2/04573; B41J 13/0009
See application file for complete search history.

(56) References Cited

U.S. PATENT DOCUMENTS

2002/0024544 A1* 2/2002 Codos ................ B41J 11/00212 400/55
2014/0078204 A1* 3/2014 Saitou .................... B41J 25/308 347/14
2016/0129708 A1 5/2016 Sasaki
2019/0181390 A1* 6/2019 Quinn .................... H10K 50/11

FOREIGN PATENT DOCUMENTS

JP 2016-088022 5/2016

* cited by examiner

*Primary Examiner* — Jason S Uhlenhake
(74) *Attorney, Agent, or Firm* — WORKMAN NYDEGGER

(57) ABSTRACT

A recording apparatus includes a plurality of recording heads that performs recording by discharging ink onto a recording medium, a carriage on which the plurality of the recording heads are mounted, a reference portion provided at a position faceable by the plurality of recording heads, a distance sensor that is provided in either the plurality of recording heads or the reference portion to measure a distance between the plurality of recording heads and the reference portion, and a controller that controls execution of a predetermined process based on a measurement result of the distance sensor to adjust an ink adhering position discharged by each of the recording heads.

12 Claims, 7 Drawing Sheets

RECORDING APPARATUS

The present application is based on, and claims priority from JP Application Serial Number 2021-107559, filed Jun. 29, 2021, the disclosure of which is hereby incorporated by reference herein in its entirety.

BACKGROUND

1. Technical Field

The present disclosure relates to a recording apparatus.

2. Related Art

In the related art, a recording apparatus including a sensor that measures a distance between a recording head and a recording medium has been known. For example, JP-A-2016-88022 discloses a recording apparatus having a function of measuring distances between a recording medium and a recording unit by an acoustic wave type distance sensor.

However, in the recording apparatus described in JP-A-2016-88022, when a plurality of recording heads are mounted on the carriage, there is a problem in that the height of each recording head relative to the platen tends to vary. Specifically, when the recording apparatus is transported or installed, the height may shift and cause variations. When the height varies, it is difficult to adhere ink discharged from each recording head at a desired adhering position, and the quality of a printed image or the like may be degraded. In addition, there is also a problem that labor is required to adjust the height after transporting the recording apparatus or replacing the recording head. In other words, there has been a demand for the recording apparatus that can easily adjust the liquid adhering position by a plurality of recording heads.

SUMMARY

A recording apparatus includes a plurality of recording heads for discharging liquid onto a recording medium for recording, a carriage on which a plurality of the recording heads are mounted, a reference portion provided at a position configured to face the plurality of recording heads, a measuring unit that is provided in one of the plurality of recording heads and the reference portion to measure a distance between the plurality of recording heads and the reference portion, and a controller that controls execution of a predetermined process based on a measurement result of the measuring unit and adjusts an adhering position of the liquid discharged by each of the recording heads.

DESCRIPTION OF EMBODIMENTS

In the embodiment described below, a large format type recording apparatus used for printing for signage use or the like is exemplified and will be described with reference to the drawings.

In each of the following drawings, XYZ axes are provided as coordinate axes orthogonal to each other as necessary, a direction indicated by each arrow is a "+" direction, and a direction opposite to the "+" direction is a "−" direction. The Y-axis extends in a front-back direction of the recording apparatus, and a +Y direction of the recording apparatus is defined as a front side. The X-axis extends in the left-right direction of the recording apparatus, and a +X direction of the recording apparatus is defined as a rightward direction. In addition, a +X direction and a −X direction, which are directions along the X-axis, may be collectively referred to simply as an X-direction. The Z-axis is a virtual axis along the vertical direction, and the +Z direction of the recording apparatus is the upward direction. For convenience of illustration, the size of each member is made different from the actual size.

1. First Embodiment

Figure 1:
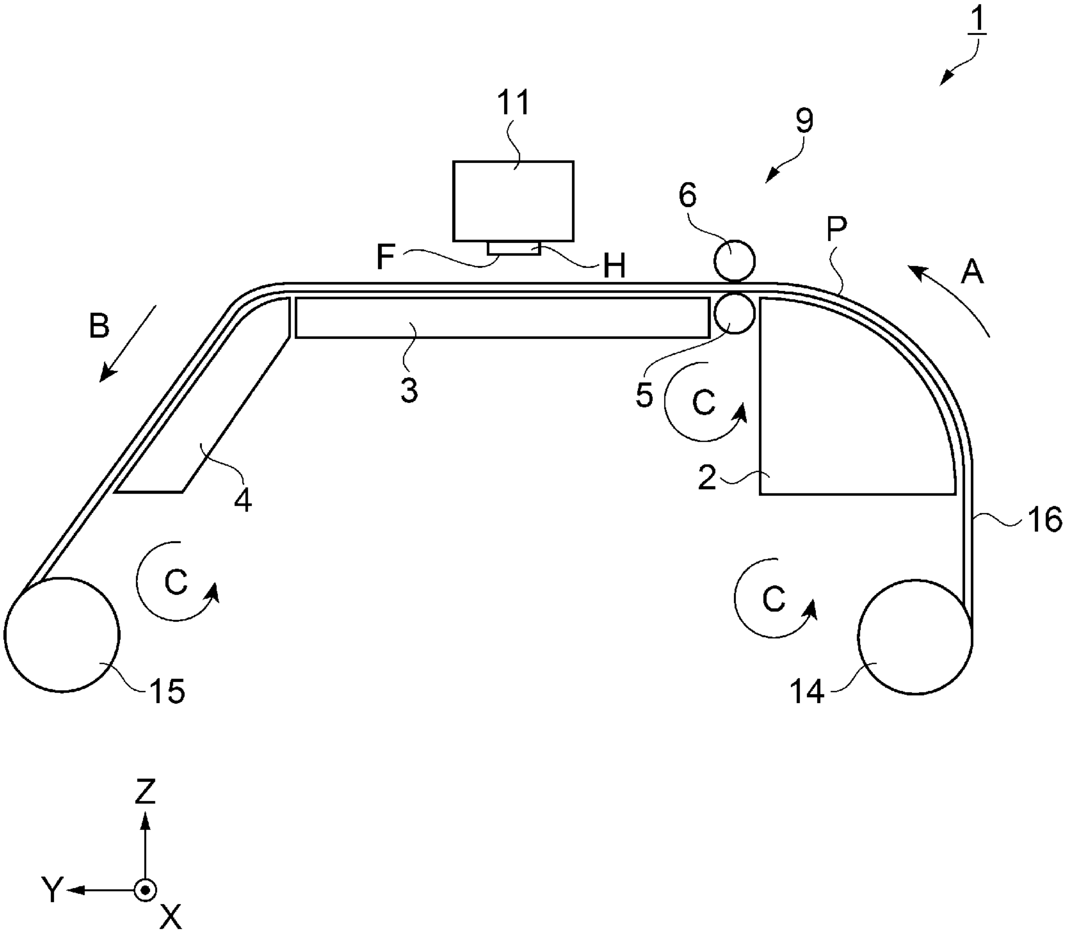
FIG. 1 is a schematic side view showing configuration of a recording apparatus according to a first embodiment.

As shown in FIG. 1, a recording apparatus 1 according to the present embodiment includes a plurality of recording heads H, a carriage 11, and a platen 3. The plurality of recording heads H discharge ink, which is a liquid, to the recording medium P supported by the platen 3 for recording. Although not shown, the recording apparatus 1 also includes a measuring unit and a controller. Unless otherwise specified, the description of FIG. 1 will be made assuming a state viewed from the side in the +X direction. Further, in FIG. 1, only one recording head H is used for convenience of illustration.

The plurality of recording heads H is mounted on the lower surface of the carriage 11 so as to face the −Z direction. Each recording head H has a nozzle face F in the −Z direction. The nozzle face F is equipped with nozzles, which will be described later. Droplets of ink are discharged from the nozzles.

Each of the plurality of recording heads H has an adjustment unit (not shown). Each recording head H is mounted on the carriage 11 via an adjustment unit. The adjustment unit adjusts the distance between a reference portion provided on the platen 3 and the recording head H. The reference portion will be described later. As the adjustment unit, for example, a mechanism that converts a rotary motion into a linear motion such as a ball screw or a stepless eccentric cam is employed. Specifically, with respect to the ball screw, the height can be adjusted by rotating a screw shaft.

A pipe from an ink tank (not shown) is coupled to each recording head H. The ink tank separately holds white ink and color ink for expressing each color. A treatment liquid such as a pretreatment agent or a coating liquid may be stored in the ink tank. In this description, liquids such as the ink and the treatment liquid described above are collectively referred to as ink.

The nozzle faces F of the plurality of recording heads H are disposed to face the platen 3 via the recording medium P when the recording apparatus 1 performs recording. The recording head H is an inkjet head driven by a piezoelectric element. The discharge drive of the recording head H is not limited to use of the piezoelectric elements.

The carriage 11 is disposed opposite to the platen 3. The carriage 11 reciprocates in the X-direction with respect to the recording medium P by a carriage drive unit (not shown). In other words, the carriage 11 is scanned in the X-direction intersecting with the +Y direction, which is the transport direction in which the recording medium P is transported across the platen 3. The carriage drive unit applies a driving force for reciprocating movement to the carriage by a carriage motor described later. The position of the carriage 11 in the X-direction is detected by an encoder included in the carriage drive unit.

The recording apparatus 1 includes, as a transport and support mechanism of the recording medium P, a feeding unit 14, support members 2 and 4, a transport unit 9, the platen 3, and a winding unit 15. In the feeding unit 14, the recording medium P, which is in a rolled-up state before recording, is unwound and transported to the platen 3. In the winding unit 15, the recording medium P after recording is wound into a rolled-up state. In other words, the recording apparatus 1 has a configuration capable of recording on a rolled-up recording medium P. The form of the recording medium P is not limited to a rolled-up state, and may be a cut sheet. In addition, the recording apparatus 1 may be a flatbed type in which recording is performed without transporting the recording medium P.

The recording medium P is transported from the feeding unit 14 by the transport unit 9. At this time, the rolled-up recording medium P is unwound by being rotated, for example, in the rotation direction C so that the recording surface 16 faces upward on the platen 3.

The recording medium P, which is unwound from the feeding unit 14 and transported upward, reaches the support member 2. In the support member 2, a region in contact with the recording medium P is formed in an arc shape. The recording medium P is transported in the transport direction A while being in contact with the region of the support member 2. As a result, the recording medium P reaches the transport unit 9.

The transport unit 9 includes a drive roller 5 and a driven roller 6. The drive roller 5 and the driven roller 6 are disposed between the support member 2 and the platen 3. The driven roller 6 is positioned above the drive roller 5. Each of the drive roller 5 and the driven roller 6 has a cylindrical shape, and their respective rotation axes extend along the X-axis.

The drive roller 5 and the driven roller 6 transport the recording medium P in the +Y direction by rotating with the recording medium P pinched therebetween. More specifically, the drive roller 5 and the driven roller 6 unwind and draw out the rolled-up recording medium P in a rolled-up state from the feeding unit 14, and transport the recording medium P to the platen 3 via the support member 2. The drive roller 5 is rotated in a counterclockwise rotation direction C by the drive of a transport motor to be described later. The driven roller 6 rotates clockwise corresponding to the rotation of the drive roller 5. As a result, the recording medium P reaches the platen 3.

The platen 3 has an upper surface formed in a flat plate shape. The recording medium P is conveyed in the +Y direction while being supported by the upper surface of the platen 3. As described above, on the platen 3, ink droplets are attached to the recording medium P from the plurality of recording heads H. At this time, the plurality of recording heads H are scanned in the direction along the X-axis, and the recording medium P is transported in the +Y-direction. Therefore, the plurality of recording heads H can scan relatively in a direction along the X-axis and can move relatively in a direction along the Y-axis with respect to the recording medium P. As a result, an image, text, a pattern, or the like is formed on the recording medium P and recorded. The recording medium P reaches the support member 4 from the platen 3.

The support member 4 is arranged in the +Y direction of the platen 3. The support member 4 is inclined downward in the +Y direction. Due to the inclination of the support member 4, the support member 4 guides the transport direction of the recording medium P from the +Y direction to the transport direction B. The winding unit 15 is provided after the inclination of the support member 4.

The winding unit 15 is driven by a motor (not shown) to rotate, for example, in the rotation direction C to wind the recording medium P into a rolled-up state.

Figure 2:
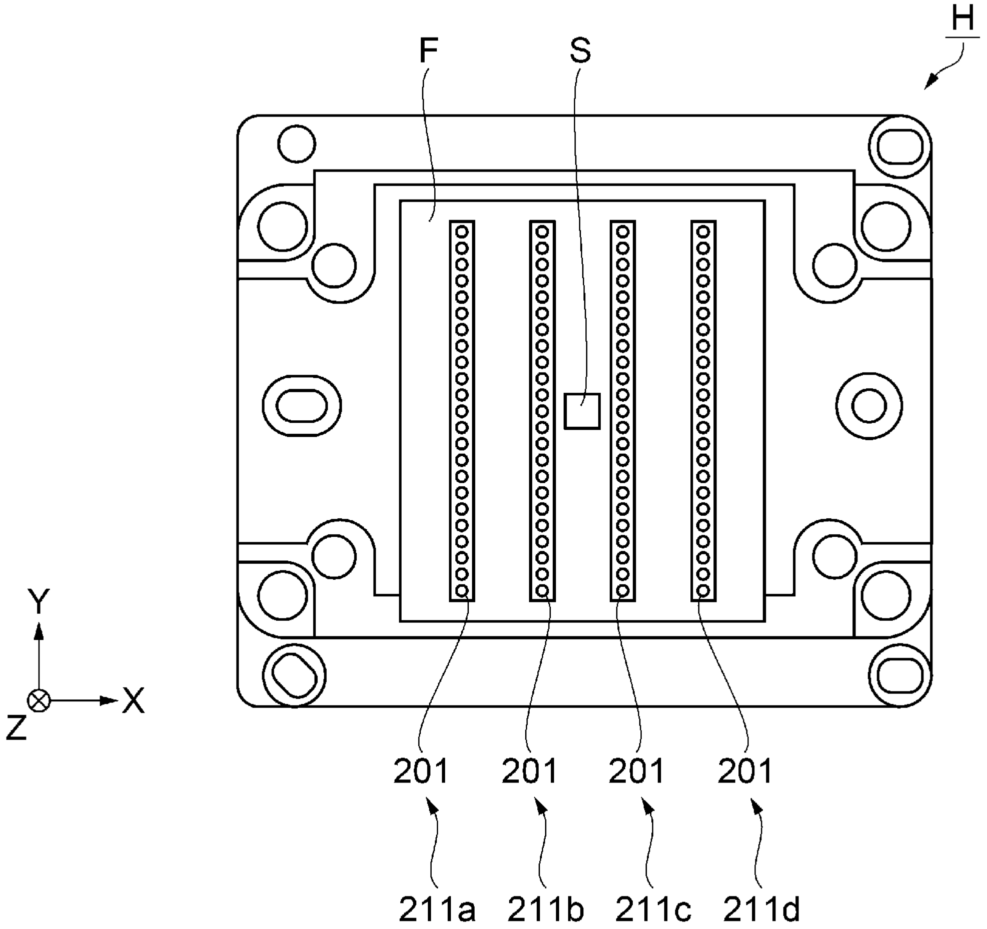
FIG. 2 is a plan view showing configuration of a recording head.
Figure 3:
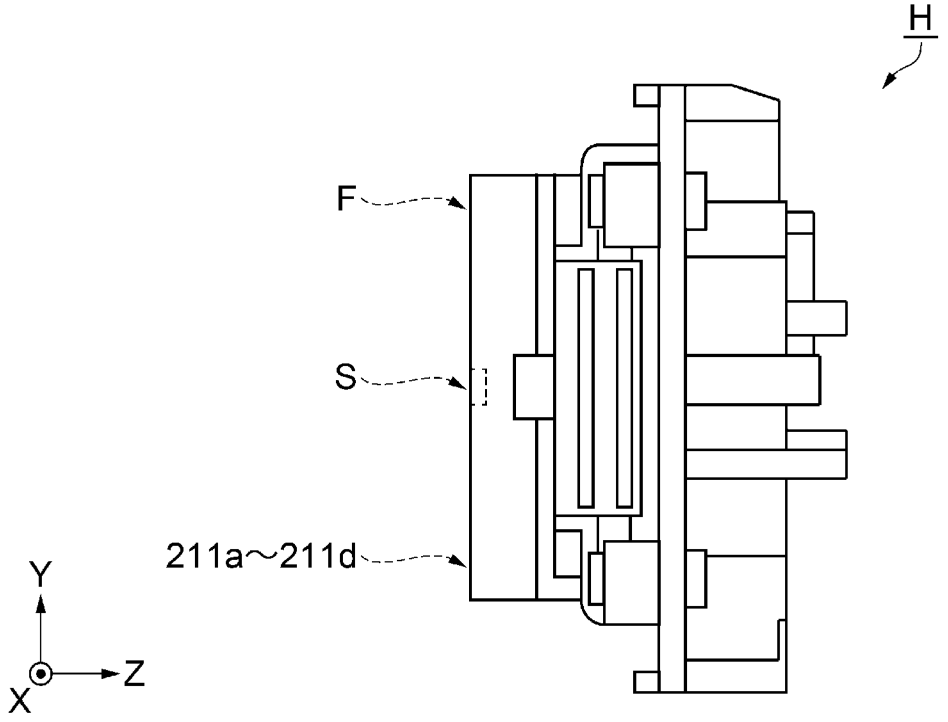
FIG. 3 is a side view showing configuration of the recording head.

As shown in FIGS. 2 and 3, a distance sensor S as a measuring unit is disposed in the recording head H. In other words, a distance sensor S is provided in each recording head H. The distance sensors S measure distance between each of the plurality of recording heads H and a reference portion (described later) of the platen 3. The distance sensor S is not limited to being provided in the recording head H. The distance sensor S may be installed on either the plurality of recording heads H or on the reference portion provided on the platen 3. The arrangement of the distance sensor S in the recording apparatus 1 will be described later.

In plan view from the −Z direction, the recording head H is substantially rectangular, and a substantially rectangular nozzle face F is provided at the center of the recording head H. In a side view from the +X direction, the nozzle face F protrudes in the −Z direction.

On the nozzle face F, four nozzle arrays 211*a*, 211*b*, 211*c*, 211*d* are arranged in this order in the +X direction. Each nozzle array 211*a*, 211*b*, 211*c*, 211*d* extends along the Y-axis. Each of the nozzle arrays 211*a*, 211*b*, 211*c*, 211*d* is composed of a plurality of nozzles 201. Droplets of the corresponding type of ink are discharged from each nozzle 201 of the nozzle array 211*a*, 211*b*, 211*c*, 211*d*. The nozzle arrays disposed on the nozzle face F are not limited to the above-described configuration.

In the recording head H, the distance sensor S is provided at the center in the direction along the Y-axis which is the transport direction of the recording medium P in the platen 3, and between the nozzle array 211*b* and the nozzle array 211*c*. In other words, in a plane view from the −Z direction, the distance sensor S is located near the intersection of two diagonal lines of the substantially rectangular nozzle face F.

As a result, the influence of the carriage 11 to platen 3 alignment on the measurement by the distance sensor S of the distance between the recording head H and the reference portion can be suppressed. Specifically, depending on how the carriage 11 is supported, the nozzle face F of the recording head H may be inclined with respect to the surface above the platen 3. Even in this case, since the distance sensor S is disposed at the center in the transport direction of the recording medium P, it is possible to measure the distance between the recording head H and the reference portion while suppressing the influence of the inclination. In addition, since the distance sensor S is provided facing downward similarly to the nozzle face F of the recording head H, it is difficult for contaminants such as dust to adhere to the distance sensor S, and it is possible to maintain the performance of the distance sensor S.

The distance sensor S is a non-contact distance measuring device. Examples of the distance sensor S include an optical type, an acoustic wave type, and an ultrasonic type. In the present embodiment, an ultrasonic sensor including a thin-film piezoelectric element described below is employed as the distance sensor S.

The ultrasonic sensor includes a substrate having an opening penetrating in a thickness direction, a diaphragm closing the opening, a thin-film piezoelectric element provided at a position corresponding to the opening on a back surface of the diaphragm, and an elastic layer inside the opening and facing the thin-film piezoelectric element via the diaphragm. The vibration region of the diaphragm and the thin-film piezoelectric element constitute one ultrasonic transducer.

In the ultrasonic sensor, by applying a pulse voltage of a predetermined frequency between two electrodes of the thin-film piezoelectric element, the thin-film piezoelectric element is bent and the vibration region vibrates, and ultrasonic waves are transmitted from the opening portion. When the ultrasonic wave propagated toward the ultrasonic sensor vibrates the vibration region of the diaphragm, a potential difference is generated between the two electrodes of the thin-film piezoelectric element. By detecting the potential difference, it is possible to detect the oscillation and reception timing of the ultrasonic wave. Further, the distance sensor S includes a temperature and humidity sensor, and calculates the speed of sound from the measured temperature and humidity. The temperature and humidity sensor may not be located at the same position as the distance sensor S.

According to the configuration described above, the distance between the ultrasonic sensor and the measurement target can be measured by transmitting the ultrasonic wave to the measurement target and receiving the ultrasonic wave reflected by the measurement target. The ultrasonic sensor of the present embodiment is a small ultrasonic sensor specialized for a case where an object is at a short distance.

According to an ultrasonic sensor including the thin-film piezoelectric element, the spatial resolution in distance measurement can be improved as compared with an ultrasonic sensor not using a thin-film piezoelectric element. Further, miniaturization is easy as compared with an optical type or acoustic wave type. Therefore, the distance sensor S becomes small in size and light in weight, and can be easily mounted on the recording head H. Further, the ultrasonic sensor has an advantage that it is less affected by the color of the measurement target and the reflectance of the surface than the optical type.

Figure 4:
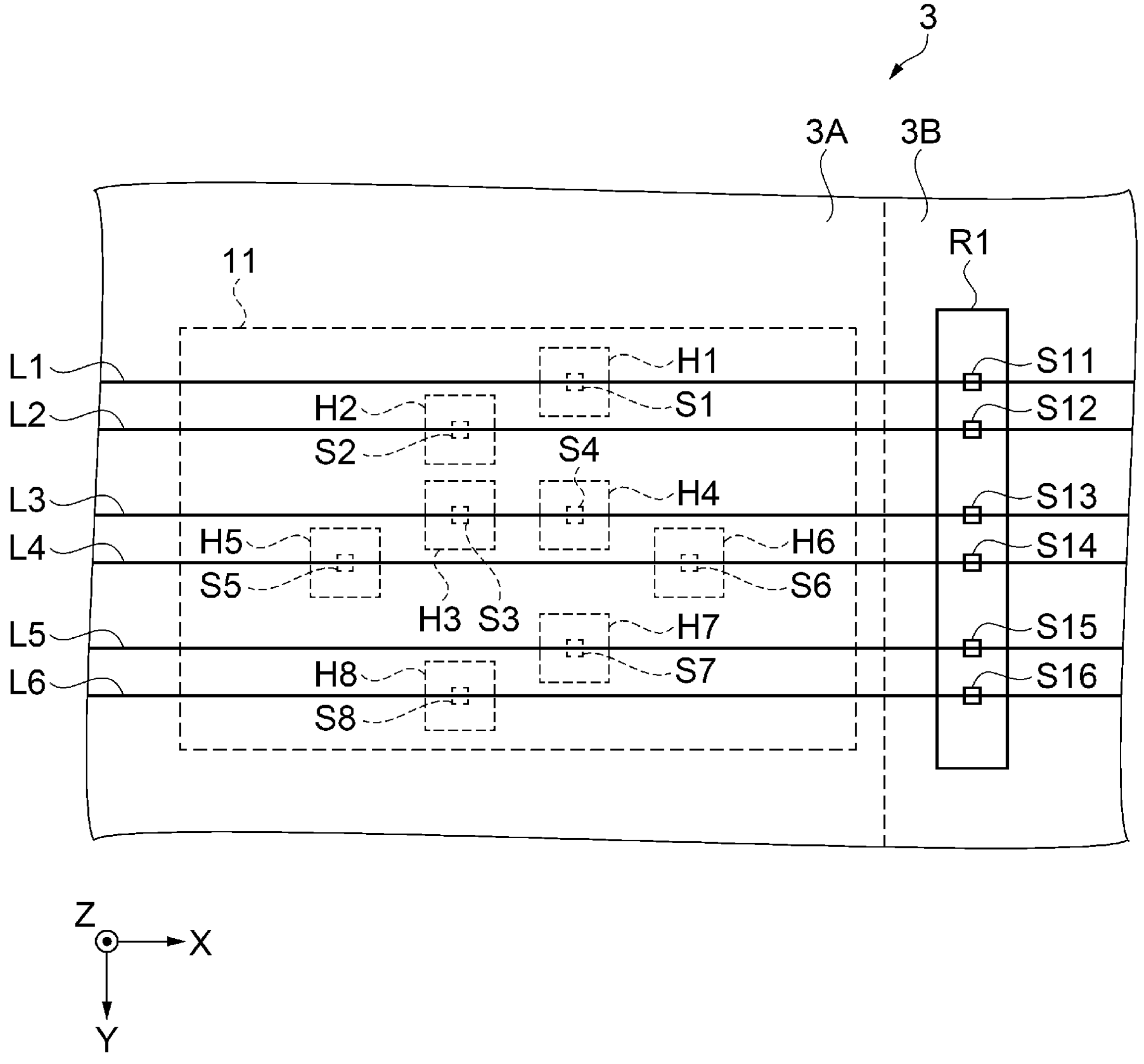
FIG. 4 is a schematic plan view showing an arrangement of the recording head and a reference portion.

As shown in FIG. 4, the platen 3 includes platens 3A and 3B adjacent to each other. Here, in FIG. 4, the carriage 11 and the like are indicated by broken lines, and the vicinity of a boundary between the platen 3A and the platen 3B in the +X direction in a range scanned by the carriage 11 is illustrated in an enlarged manner. In the explanation of FIG. 4, a state viewed from above in plan view will be described unless otherwise specified.

The platen 3A is a transport path along which a recording medium P (not shown) is transported. In other words, the range of the platen 3A in the direction along the X-axis is also a range in which the carriage 11 is scanned during recording by the recording apparatus 1. The platen 3B is disposed outside in the +X direction of the platen 3A, which is a transport path along which the recording medium P is transported. A boundary between the platen 3A and the platen 3B extends along the Y-axis. The platen 3B is not limited to being disposed in the +X direction with respect to the platen 3A, and may be disposed in the −X direction.

Recording heads H1, . . . , H8 are mounted on the carriage 11 as a plurality of recording heads H. Distance sensors S1, S8 which are the distance sensor S are provided corresponding to each recording head H1, . . . , H8. Each of the plurality of recording heads H and the plurality of distance sensors S is disposed on virtual straight lines L1 to L6 along the X-axis.

More specifically, the recording head H1 and the distance sensor S1 are arranged on the virtual straight line L1. The recording head H2 and the distance sensor S2 are disposed on the virtual straight line L2. The recording heads H3 and H4 and the distance sensors S3 and S4 are arranged on the virtual straight line L3. The recording heads H5 and H6 and the distance sensors S5 and S6 are arranged on the virtual straight line L4. The recording head H7 and the distance sensor S7 are disposed on the virtual straight line L5. The recording head H8 and the distance sensor S8 are disposed on the virtual straight line L6.

Among the plurality of recording heads H, the recording heads H1, H4, and H7 and the recording heads H2, H3, and H8 are aligned in the direction along the Y-axis. The number and arrangement of the plurality of recording heads H and the plurality of distance sensors S are not limited to those described above.

The reference portion R1 has a substantially rectangular shape elongated in the direction along the Y-axis. The reference portion R1 is provided on the platen 3B, for example, between the platen 3A and the maintenance position of the carriage 11 in the recording apparatus 1. Since the reference portion R1 is provided outside the transport path of the recording medium P, it is difficult for the reference portion R1 to contact the recording medium P. Therefore, the adhesion of dust or the like derived from the recording medium P can be suppressed, and the reference portion R1 can be kept clean. The reference portion R1 is not limited to a substantially rectangular shape elongated in the direction along the Y-axis, and may be divided and disposed in the Y-axis direction in a substantially rectangular region elongated in the direction along the Y-axis.

The carriage 11 can move to a region including the reference portion R1. When the carriage 11 is scanned in the +X direction beyond the platen 3A, each distance sensor S and the reference portion R1 face each other. The distance between each recording head H and the reference portion R1 is measured by bringing them into confrontation in the direction along the Z-axis. The reference portion R1 sequentially faces the respective recording heads H as the carriage 11 is scanned in the X-direction. At this time, the distance between each recording heads H and the reference portion R1 is measured sequentially.

Note that the distance sensor S is not limited to being mounted on each recording head H. The distance sensor S may be provided on the reference portion R1 corresponding to the recording heads H. In other words, as the distance sensor S, instead of the distance sensors S1 to S8, a plurality of distance sensors S11 to S16 may be provided in the reference portion R1. More specifically, in the reference portion R1, the distance sensor S11 may be placed on the virtual straight line L1, the distance sensor S12 on the virtual straight line L2, the distance sensor S13 on the virtual straight line L3, the distance sensor S14 on the virtual straight line L4, the distance sensor S15 on the virtual straight line L5, and the distance sensor S16 on the virtual straight line L6, respectively.

The carriage 11 is movable to a position in opposition with the reference portion R1. By scanning the carriage 11 in the X-direction, the recording heads H3 and H4 can share the distance sensor S13, and the recording heads H5 and H6 can share the distance sensor S14. In this way, a plurality of recording heads H that are arranged in the carriage 11 along a straight line in the scanning direction can share a distance sensor S provided in the reference portion R1. Thus, the number of the distance sensors S can be reduced.

Figure 5:
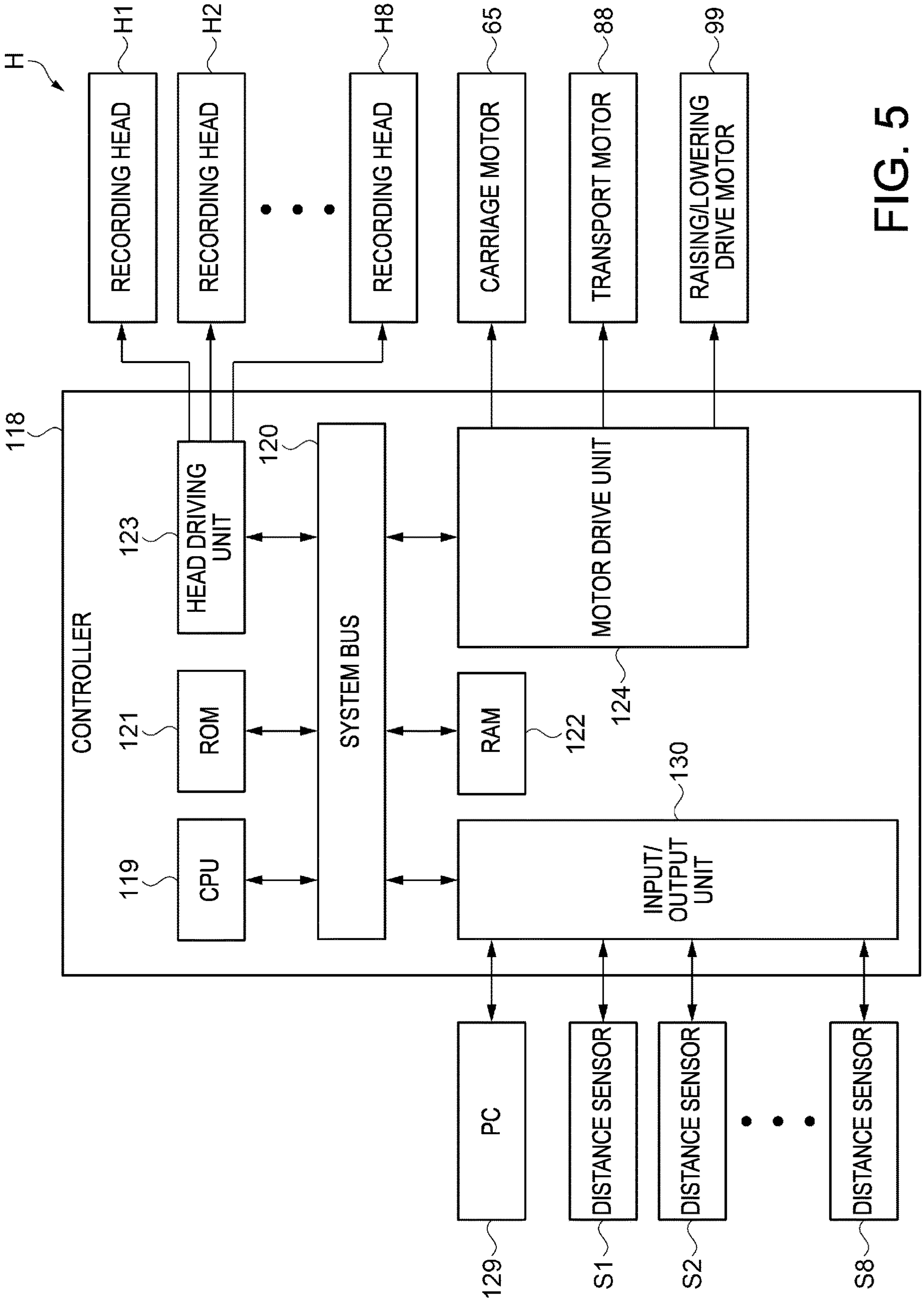
FIG. 5 is a block diagram of the recording apparatus.

As shown in FIG. 5, a controller 118 includes a central processing unit (CPU) 119, a system bus 120, a read only memory (ROM) 121, a random access memory (RAM) 122, a head driving unit 123, a motor driving unit 124, and an input/output unit 130.

The CPU 119 controls the entire recording apparatus 1. The CPU 119 Is electrically coupled to the ROM 121, the RAM 122 and the head driving unit 123 via the system bus 120. The ROM 121 stores various control programs, a maintenance sequence, and the like, to be executed by the CPU 119. The RAM 122 stores data temporarily. The head driving unit 123 drives the recording heads H1, H2, . . . , H8 which are a plurality of recording heads H.

The CPU 119 Is electrically coupled to the motor driving unit 124 via the system bus 120. The motor driving unit 124 is electrically coupled to a carriage motor 65, a transport motor 88, and a raising/lowering drive motor 99.

The carriage motor 65 is included in the above-described carriage drive unit. The carriage motor 65 reciprocates the carriage 11 in the X-direction. The transport motor 88 drives the above-described drive roller 5 to transport the recording medium P. The raising/lowering drive motor 99 moves the carriage 11 in the direction along the Z-axis. Accordingly, the distances between the plurality of recording heads H and the platen 3 and the recording medium P are uniformly changed.

The CPU 119 Is electrically coupled to the input/output unit 130 via the system bus 120. The input/output unit 130 is electrically coupled to the distance sensors S1, S2, . . . , S8, which are measuring units, and a personal computer (PC) 129. The PC 129 is an information device that inputs recording data and the like to the recording apparatus 1. Instead of the distance sensors S1 to S8, the distance sensors S11 to S16 described above may be used.

The distance sensor S includes distance sensors S1, S2, . . . , S8 corresponding to each of the recording heads H1, H2, . . . , H8 which are the plurality of recording heads H. Each of the distance sensors S1, S2, . . . , S8 measures a distance between the corresponding one of the recording heads H1, H2, . . . , H8 and the reference portion R1 described above, that is, the height of each recording head H with respect to the platen 3.

Measurement of the height of each recording head H is performed before shipment of the recording apparatus 1. In addition, the measurement of the height is performed at an arbitrary time such as after shipment, after transportation of the recording apparatus 1, after installation, after use for a certain period time, and after replacement of the recording head H. Information including the measured height of each recording head H is transmitted to the controller 118 and stored in the RAM 122. In particular, the information before shipment of the recording apparatus 1 is the information in an initial state in which the height of each recording head H is adjusted in advance. The information is stored in the RAM 122 of the controller 118 as initial information on the distance between respective recording heads H and reference portions R1.

The controller 118 executes predetermined processing based on the height information of each recording head H, which is a measurement result of the distance sensor S. By a predetermined process of the controller 118, the adhering position of ink discharged by each recording head H1, H2, . . . , H8 is adjusted. Note that the height information of each recording head H by the distance sensor S does not include the thickness of the recording medium P. The adjustment corresponding to the thickness of the recording medium P may be performed by raising/lowering the carriage 11 by the raising/lowering drive motor 99.

The predetermined process in the controller 118 may be executed based on the initial information about the distance and the measurement result about the height of each recording head H at an arbitrary time after shipment. According to this, by referring to the stored initial information, the measurement result at an arbitrary time is compared with the initial information. In the case where there is a difference between the two, by performing correction as a predetermined process for reducing the difference, it is possible to easily adjust the ink adhering position.

The predetermined process by the controller 118 includes, as software adjustment, correcting at least one of ejection timing and ejection speed of the ink droplet in each recording head H. The predetermined process also includes the above-described adjustment by the adjustment unit, which is a mechanical adjustment, and assistance when the adjustment is manually performed.

First, the software adjustment as the predetermined process will be described. For example, the ROM 121 stores in advance a plurality of discharge conditions such as the ejection timing and the ejection speed of the ink droplet that correspond to the distance between the reference portion R1 and each recording head H. The controller 118 reads out from the ROM 121 the discharge condition corresponding to the measured height of each recording head H. Next, the controller 118 corrects the ejection timing and the ejection speed of the ink droplet based on the discharge conditions described above, and controls the head driving unit 123 via the system bus 120.

The adjustment of the ejection timing also includes correction of ink droplet ejection timing of each recording head H which is scanned together with the carriage 11 during recording. As a result, the microscopic positions where ink droplets adhere to the recording medium P are corrected. In addition, the adjustment of the ejection speed includes correction of the ejection speed of ink droplets from each recording head H which is scanned during recording. As a result, the microscopic positions where ink droplets adhere to the recording medium P are corrected.

As described above, the ejection timing and the ejection speed of ink droplets are corrected as software adjustment, and the adhering position of the ink droplet can be easily adjusted.

Next, a mechanical adjustment of the predetermined processing will be described. For example, the difference between the initial information stored in the RAM 122 and the measurement result of the distances between the reference portion R1 and each recording head H is mechanically eliminated by the adjustment unit. That is, as the predetermined process, the distances between the reference portion R1 and each recording head H are automatically adjusted so as to return to the initial state by controlling the adjustment unit. When a ball screw or an eccentric cam is used as the adjustment unit, these are rotationally driven by a motor (not shown) controlled by the controller 118. This makes it possible to easily adjust the ink adhering position on the recording medium P. In the case of automatic adjustment, both of software adjustment and mechanical adjustment may be performed. For example, adjustment up to a predetermined range may be corrected by software adjustment, and adjustment beyond the predetermined range may be performed by mechanical adjustment.

The above-mentioned mechanical adjustment may be performed manually. To be specific, in manual adjustment via the adjustment unit, the controller 118 may notify adjustment information for using the adjustment unit to adjust the distances between the reference portion R1 and each recording head H.

Examples of the adjustment information include information about differences between the initial information stored in the RAM 122 and measurement results about distances between the reference portion R1 and each recording head H, guidance information about an appropriate adjustment amount in the adjustment unit, and information indicating that appropriate adjustment has been completed. The notification may be performed by, for example, a display panel (not shown) provided in the recording apparatus 1, a display of the PC 129, a notification sound, voice, or indicator light.

This eliminates the need for measuring the distances between the reference portion R1 and the recording heads H with a gap gauge or the like each time, and makes it possible to more easily adjust the ink adhering position on the recording medium P.

Preferably, the adjustment information is updated sequentially at predetermined time intervals. In other words, during manual adjustment, it is possible to proceed with the adjustment while confirming the updated adjustment information. Therefore, the adjustment operation can be performed more easily.

According to this embodiment, the following effects can be obtained. It is possible to easily adjust the adhering position of ink discharged by each recording head H with respect to the recording medium P. More specifically, the distances between the reference portion R1 and the plurality of recording heads H, that is, the heights of the recording heads H, are measured by the distance sensor S. Therefore, it is possible to omit the time and effort of measuring the height using, for example, a gap gauge. In addition, the ink adhering position on the recording medium P is adjusted by a predetermined process performed by the controller 118. Therefore, even if the heights of the plurality of recording heads H have variability, it is possible to easily adjust the adhering position. Therefore, it is possible to provide the recording apparatus 1 which can easily adjust the ink adhering position.

2. Second Embodiment

In the recording apparatus according to the present embodiment, the arrangement of the reference portion R1 is changed with respect to the recording apparatus 1 of the first embodiment. In the following description, the same components as those in the first embodiment are denoted by the same reference numerals, and a repetitive description thereof will be omitted.

Figure 6:
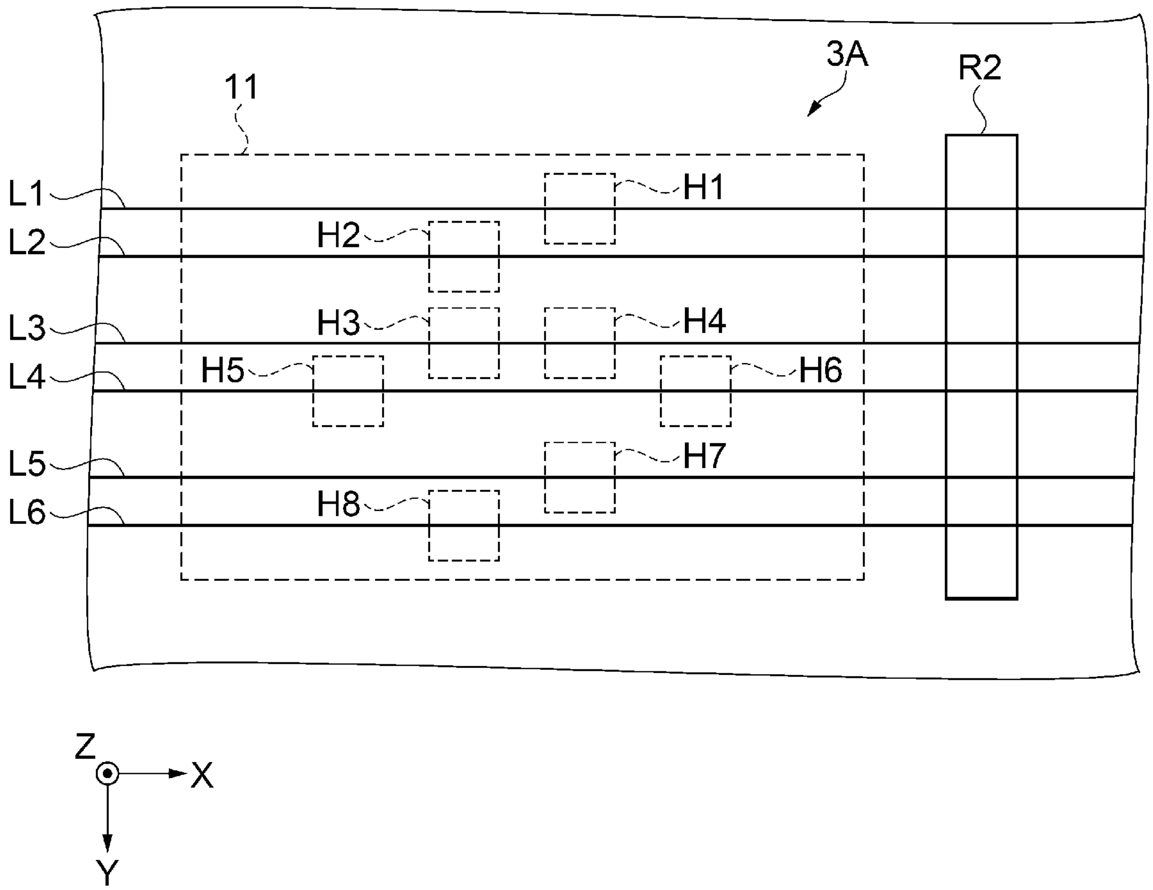
FIG. 6 is a schematic plan view showing an arrangement of a recording head and a reference portion according to a second embodiment.

As shown in FIG. 6, in the recording apparatus of the present embodiment, the reference portion R2 is provided on the platen 3A. As described above, the platen 3A is inside the scanning range in which the carriage 11 is scanned during recording. That is, the reference portion R2 is provided at a position facing the recording heads H1, . . . , H8, which are each recording heads H, when the carriage 11 scans the scanning range during recording. The reference portion R2 has a substantially rectangular shape elongated in the direction along the Y-axis in plan view from above.

In this embodiment, as in the first embodiment, the measurement sensor S is provided on either each recording head H or the reference portion R2.

According to this embodiment, the same effects as those of the first embodiment can be obtained.

3. Third Embodiment

In the recording apparatus according to this embodiment, the arrangement and form of the reference portion R2 are changed from those of the recording apparatus according to the second embodiment. In the following description, the same components as those in the first embodiment are denoted by the same reference numerals, and a repetitive description thereof will be omitted.

Figure 7:
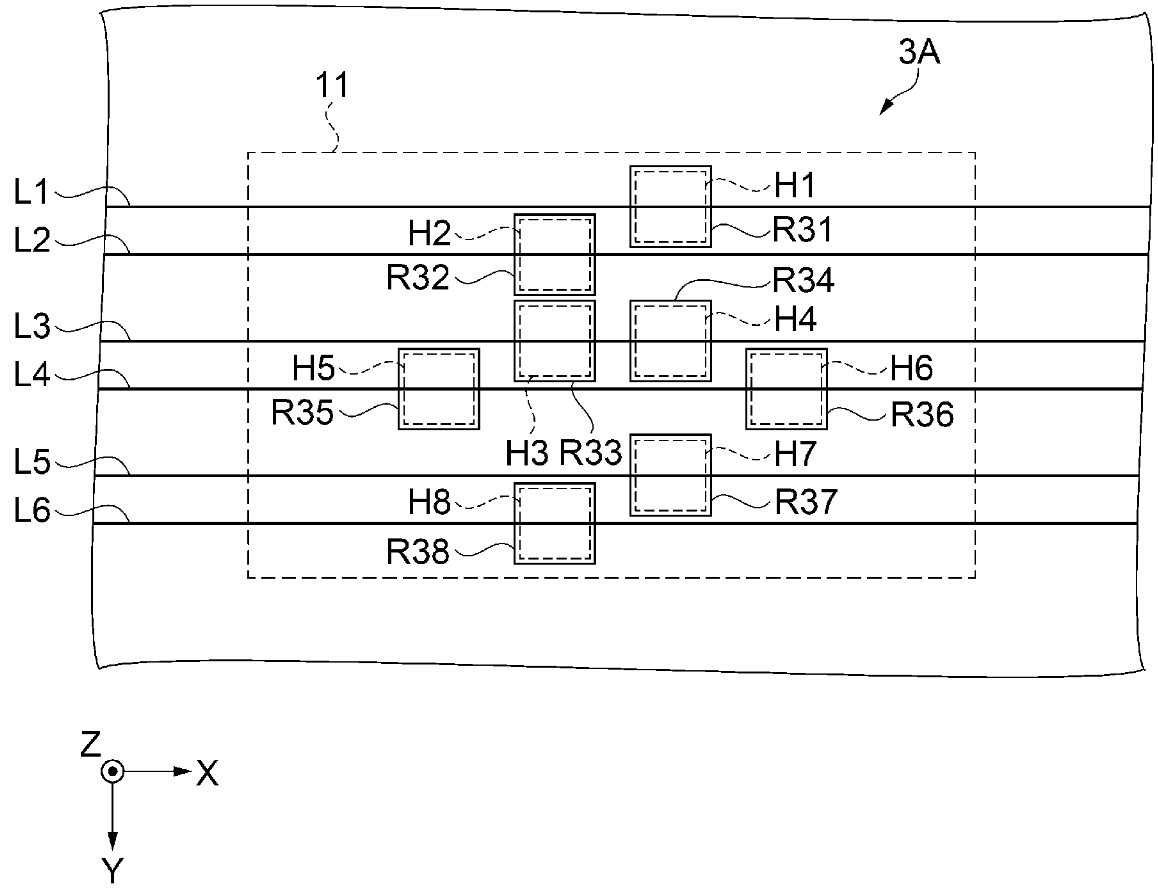
FIG. 7 is a schematic plan view showing the arrangement of a recording head and a reference portion according to a third embodiment.

As shown in FIG. 7, in the recording apparatus of the present embodiment, the reference portions R31 to R38 are provided on the platen 3A. The reference portions R31 to R38 do not have an integral form as in the above-described embodiment, but are divided and provided corresponding to the arrangement of the recording heads H. Each of the reference portions R31 to R38 has a substantially rectangular shape in plan view from above, and has an area that overlaps with each of the recording heads H.

When the carriage 11 is scanned during recording, the reference portions R31 to R38 face the plurality of recording heads H1, - - - , H8 at the same time. Specifically, the recording head H1 and the reference portion R31, the recording head H2 and the reference portion R32, the recording head H3 and the reference portion R33, the recording head H4 and the reference portion R34, the recording head H5 and the reference portion R35, the recording head H6 and the reference portion R36, the recording head H7 and the reference portion R37, the recording head H8 and the reference portion R38 face each other at the same time.

This makes it possible to simultaneously measure the distances between the plurality of recording heads H and the corresponding reference portions R31 to R38, that is, the height of the recording heads H. Therefore, it is possible to measure the height in a short time.

Furthermore, the arrangement of the reference sections R31 to R38 is not limited to having all of the reference portion R31 to R38 facing the plurality of recording heads H at the same time. For example, when there is a minute undulation or inclination in the X-direction of the platen 3A, the reference portion R31 to R38 may be provided in an arbitrary region in which the influence of the undulation or the inclination is reduced. According to this, it is possible to improve the quality of an image or the like recorded by the recording apparatus.

What is claimed is:

1. A recording apparatus comprising:

a plurality of recording heads that perform recording by discharging liquid onto a recording medium;

a carriage on which the plurality of recording heads are mounted;

a reference portion provided at a position faceable by the plurality of recording heads;

a measuring unit that is provided in either the plurality of recording heads or the reference portion to measure distances between the plurality of recording heads and the reference portion; and a controller that controls execution of a predetermined process based on a measurement result of the measuring unit to adjust adhering position of liquid discharged by each of the recording heads, wherein:

the carriage is scanned in a direction intersecting a transport direction in which the recording medium is transported, the reference portion is provided at a position that is inside a scanning range in which the carriage is scanned and that faces each of the recording heads when the carriage is scanned, and the reference portion is provided outside a transport path along which the recording medium is transported, and sequentially faces each of the recording heads as the carriage is scanned.

2. The recording apparatus according to claim 1, wherein:

the controller stores information of the distances adjusted in advance, and executes the predetermined process based on the measurement result and the information of the distances.

3. The recording apparatus according to claim 1, wherein:

the predetermined process corrects at least one of the ejection timing or the ejection speed of the liquid.

4. The recording apparatus according to claim 1, wherein:

each of the recording heads includes an adjustment unit that adjusts distance with respect to the reference portion; and in the predetermined processing, the adjustment units are controlled to automatically adjust the distances.

5. The recording apparatus according to claim 3, wherein:

each of the recording heads includes an adjustment unit that adjusts distance with respect to the reference portion; and the predetermined process includes a process of correcting at least one of the ejection timing or the ejection speed of the liquid, and a process of controlling the adjustment unit to automatically adjust the distance.

6. The recording apparatus according to claim 1, wherein:

each of the recording heads includes an adjustment unit that adjusts distance with respect to the reference portion; and the predetermined process includes notifying adjustment information for adjusting the distance by the adjustment unit.

7. The recording apparatus according to claim 6, wherein:

the adjustment information is sequentially updated at predetermined time intervals.

8. The recording apparatus according to claim 1, wherein:

the reference portion simultaneously faces the plurality of recording heads when the carriage is scanned.

9. The recording apparatus according to claim 1, wherein:

the measuring unit is provided in each of the recording heads.

10. The recording apparatus according to claim 9, wherein:

the measuring unit is disposed at a transport direction center of the recording head.

11. The recording apparatus according to claim 1, wherein:

the measuring unit has an ultrasonic sensor including a thin-film piezoelectric element.

12. A recording apparatus comprising:

a plurality of recording heads that perform recording by discharging liquid onto a recording medium;

a carriage on which the plurality of recording heads are mounted;

a reference portion provided at a position faceable by the plurality of recording heads;

a measuring unit that is provided in either the plurality of recording heads or the reference portion to measure distances between the plurality of recording heads and the reference portion; and a controller that controls execution of a predetermined process based on a measurement result of the measuring unit to adjust adhering position of liquid discharged by each of the recording heads, wherein:

a plurality of the measuring units is provided in the reference portion so as to correspond to the plurality of the recording heads.

* * * * *